United States Patent
Tran et al.

(10) Patent No.: US 8,166,145 B2
(45) Date of Patent: Apr. 24, 2012

(54) MANAGING EVENT-BASED CONDITIONAL RECURRENT SCHEDULES

(75) Inventors: Anh P. Tran, Seattle, WA (US); Lloyd Alfred Moore, Renton, WA (US); Christopher Todd Guillory, Kirkland, WA (US); Gary Jason Waliczek, Seattle, WA (US); Poonam Ganesh Hattangady, Seattle, WA (US); Adam Sapek, Redmond, WA (US); Albert Liu, Redmond, WA (US); Kishore Kumar Prakash, Redmond, WA (US); Jane Van-nha Ly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 12/051,849

(22) Filed: Mar. 20, 2008

(65) Prior Publication Data

US 2009/0182608 A1   Jul. 16, 2009

Related U.S. Application Data

(63) Continuation-in-part of application No. 11/971,909, filed on Jan. 10, 2008.

(51) Int. Cl.
*G06F 15/173* (2006.01)
(52) U.S. Cl. .......................................... 709/223; 725/97
(58) Field of Classification Search .................. 709/225, 709/203, 223; 718/100, 102, 103; 725/97
See application file for complete search history.

(56) References Cited

U.S. PATENT DOCUMENTS

| | | | |
|---|---|---|---|
| 5,369,798 A | 11/1994 | Lee | |
| 5,692,125 A | 11/1997 | Schloss et al. | |
| 5,867,657 A | 2/1999 | Bolosky et al. | |
| 6,112,061 A | 8/2000 | Rapeli | |
| 6,901,592 B2 | 5/2005 | Mar et al. | |
| 7,099,689 B2 | 8/2006 | Bahl et al. | |
| 7,130,313 B2 | 10/2006 | Pekonen | |
| 7,137,099 B2 | 11/2006 | Knight et al. | |
| 7,433,714 B2 * | 10/2008 | Howard et al. | 455/567 |
| 2002/0016729 A1 * | 2/2002 | Breitenbach et al. | 705/9 |
| 2003/0105809 A1 | 6/2003 | Yoshii et al. | |
| 2003/0135643 A1 | 7/2003 | Chiu et al. | |
| 2003/0149809 A1 | 8/2003 | Jensen et al. | |
| 2004/0002943 A1 * | 1/2004 | Merrill et al. | 707/1 |
| 2004/0063442 A1 | 4/2004 | Goldberg | |
| 2004/0103411 A1 | 5/2004 | Thayer | |
| 2004/0109436 A1 | 6/2004 | Vargas et al. | |
| 2004/0196866 A1 | 10/2004 | Park et al. | |
| 2004/0216098 A1 | 10/2004 | Roe et al. | |

(Continued)

OTHER PUBLICATIONS

Shih, et al., "Wake on Wireless: An Event Driven Energy Saving Strategy for Battery Operated Devices", International Conference on Mobile Computing and Networking, Proceedings of the 8th annual international conference on Mobile computing and networking, Atlanta, Georgia, USA, Year of Publication: 2002, pp. 160-171.

(Continued)

*Primary Examiner* — Frantz Jean

(57) ABSTRACT

Managing recurrent schedules based on events and conditions. Schedules from a plurality of applications are identified based on an activation time for the schedules and a determination of whether or not conditions defined for the schedules are met. The identified schedules are activated by performing actions associated with each of the identified schedules. In an embodiment, the schedules are grouped based on functionality and prioritized to avoid conflicts within each group.

20 Claims, 5 Drawing Sheets

U.S. PATENT DOCUMENTS

| | | | |
|---|---|---|---|
| 2004/0225525 | A1 | 11/2004 | Weitzman |
| 2005/0043020 | A1 | 2/2005 | Lipsanen et al. |
| 2005/0108715 | A1 | 5/2005 | Kanai et al. |
| 2005/0125796 | A1 | 6/2005 | Vargas et al. |
| 2006/0068832 | A1 | 3/2006 | Islam et al. |
| 2006/0259908 | A1 | 11/2006 | Bayer |
| 2007/0058605 | A1 | 3/2007 | Meylan et al. |
| 2007/0070940 | A1* | 3/2007 | Vander Veen et al. ........ 370/328 |
| 2007/0093935 | A1 | 4/2007 | Fu |
| 2007/0097867 | A1 | 5/2007 | Kneckt et al. |
| 2007/0118590 | A1 | 5/2007 | Giacalone, Jr. |
| 2007/0149186 | A1 | 6/2007 | Barbosa et al. |
| 2007/0177558 | A1 | 8/2007 | Ayachitula et al. |
| 2007/0198698 | A1* | 8/2007 | Boyd et al. .................... 709/224 |
| 2007/0259699 | A1 | 11/2007 | Homchaudhuri |
| 2008/0025378 | A1 | 1/2008 | Mahany et al. |
| 2008/0113656 | A1 | 5/2008 | Lee et al. |
| 2008/0130541 | A1 | 6/2008 | Kokku et al. |
| 2008/0215407 | A1 | 9/2008 | Pachon et al. |
| 2009/0183157 | A1 | 7/2009 | Tran et al. |
| 2009/0307519 | A1 | 12/2009 | Hyatt |
| 2010/0195584 | A1 | 8/2010 | Wilhelmsson et al. |

OTHER PUBLICATIONS

Bahl, et al., "Reconsidering Wireless Systems with Multiple Radios", ACM SIGCOMM Computer Communication Review, vol. 34 , Issue 5 (Oct. 2004), Session: Perspective Papers, Year of Publication: 2004, pp. 39-46.

Chlamtac, et al., "Energy Conservation in Access Protocols for Mobile Computing and Communication", Microprocessors and Microsystems Journal (1998), pp. 1-11.

Rhee, et al., "Techniques for Minimizing Power Consumption in Low Data-Rate Wireless Sensor Networks", In Proc. IEEE Wireless Communications and Networking Conference (WCNC 2004), Mar. 2004, pp. 1-5.

"Pocket Power Manager 1.0", http://www.filedudes.com/Pocket_Power_Manager-download-47203.html, 2008. pp. 2.

Final Office action mailed from the USPTO in U.S. Appl. No. 12/147,774, U.S., Oct. 15, 2010, pp. 23.

Jeffay, "Scheduling Sporadic Tasks with Shared Resources in Hard-Real-Time Systems", Proceedings of the 13th IEEE Real-Time Systems Symposium, Phoenix, AZ, Dec. 1992, pp. 89-99.

Bhulai, et al., "Scheduling Time-Constrained Jobs in the Presence of Background Traffic", Proceedings of the 39th IEEE. Conference on Decision and Control, vol. 2, Dec. 2000, pp. 1421-1426.

Jeffay, et al., "Rate-Based Resource Allocation Models for Embedded Systems", Lecture Notes in Computer Science; vol. 2211, Proceedings of the First International Workshop on Embedded Software, Year of Publication: 2001, pp. 204-222.

Yun, et al., "Event-Based Scheduling Algorithm for Rendering SMIL Documents", Fifth IEE International Conference on 3G Mobile Communication Technologies, 2004. 3G 2004, Publication Date: 2004, pp. 509-513.

Kravets, et al., "Application Driven Power Management for Mobile Communication", Retrieved at << www-sal.cs.uiuc.edu/~rhk/pubs/winet98.ps >>, Wireless Networks, vol. 06, No. 4, Jul. 2000, pp. 1-20.

Pal, at el., "Improving Delivery Time Guarantees for Wireless Data Services", Retrieved at << http://ieeexplore.ieee.org/iel5/9178/29117/01311488.pdf?arnumber=1311488 >>, IEEE Wireless Communications and Networking Conference, WCNC, Mar. 21-25, 2004, pp. 2539-2544.

Zaharia, at el., "Fast and Optimal Scheduling over Multiple Network Interfaces", Retrieved at << http://www.acm.org/src/Matei/matei.html >>, 2007, pp. 16.

Pering, at el., "CoolSpots: Reducing the Power Consumption of Wireless Mobile Devices with Multiple Radio Interfaces", Retrieved at << https://www.usenix.org/events/mobisys06/full_papers/p220-pering.pdf >>, The 4th International Conference on Mobile Systems, Applications and Services, Jun. 19-22, 2006, pp. 220-232.

Flinn, Jason., "Managing Battery Lifetime with Energy-Aware Adaptation", Retrieved at << http://www.cs.cmu.edu/~satya/docdir/p137-flinn.pdf >>, ACM Transactions on Computer Systems, vol. 22, No. 2, May 2004, pp. 137-179.

Pering, at el., "Exploiting Radio Hierarchies for Power-Efficient Wireless Device Discovery and Connection Setup", Retrieved at << http://ieeexplore.ieee.org/iel5/9501/30140/01383368.pdf?tp=&isnumber=&arnumber=1383368 >>, 18th International Conference on VLSI Design held jointly with 4th International Conference on Embedded Systems Design (VLSID'05), India, Jan. 2007, pp. 6.

"Non-final Office action mailed from the USPTO in U.S.", U.S. Appl. No. 12/147,774, U.S., May 14, 2010, pp. 11.

"Final Office action mailed from the USPTO in U.S.", U.S. Appl. No. 12/147,744, U.S., Oct. 15, 2010, pp. 23.

Non-final Office action mailed from USPTO in U.S Sep. 21, 2011, U.S. Appl. No. 12/056,287, pp. 12.

First Office action mailed from IPO in PR China Jan. 11, 2012, Application 200980111814.X, pp. 7.

* cited by examiner

MANAGING EVENT-BASED CONDITIONAL RECURRENT SCHEDULES

CROSS-REFERENCE TO RELATED APPLICATION

This application is a continuation-in-part of commonly-owned, co-pending U.S. patent application Ser. No. 11/971,909, filed Jan. 10, 2008, the entire disclosure of which is hereby incorporated by reference herein for all purposes.

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery. Additionally, device applications execute recurring actions that often require increasing levels of such resources. Existing systems include per-application notification mechanisms that trigger the actions as appropriate.

SUMMARY

Embodiments of the invention manage conditional recurrent schedules based on notification of events. Recurrent schedules are defined to have a recurring activation time and one or more activation conditions. As event notifications are received, the schedules are identified based on the defined activation time and the activation conditions. The identified schedules are executed.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
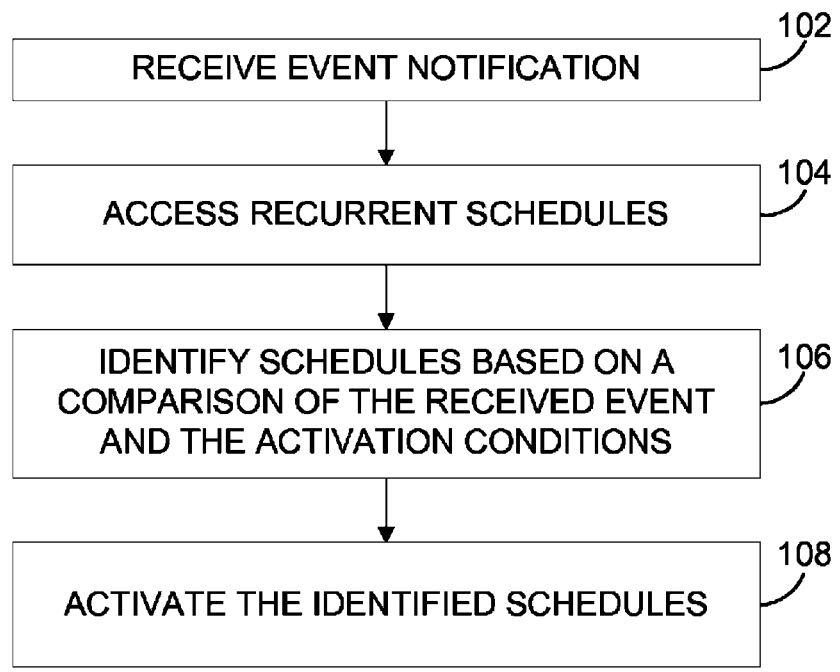
FIG. 1 is an exemplary flow chart illustrating the event-based operation of a scheduler service.

Referring to the figures, embodiments of the invention provide a scheduler service 202 executing on a computing device 204 that controls activation of conditional recurrent schedules 208 from a plurality of application programs 207. The scheduler service 202 acts as a common scheduler to manage the schedules 208 for the plurality of application programs 207. The schedules 208 are defined by the application programs 207 or by a user to occur periodically and only when defined conditions are met. The defined conditions correspond to any predefined events 404 identified by the application program 207 or the user. At the defined activation times for the schedules 208, the schedules 208 activate if the associated conditions are met. Activation of the recurrent schedules 208 includes performing or executing one or more actions 406 associated with the schedules 208. The schedules 208 are de-activated when execution of the actions 406 completes or when the state of the event(s) changes.

The following example constitutes exemplary means for managing each of the recurrent schedules 208 based on an interval duration defined for the recurrent schedules 208 and activation conditions for each of the recurrent schedules 208. In the example, a group 209 of schedules 208 includes Schedule 1 having priority 1, an interval duration of five minutes, and a condition A. Schedule 2 has a priority 2, an interval duration of ten minutes, and a condition B. Schedule 3 has a priority 3, an interval duration of fifteen minutes, and a condition C. In this group in this example, the last execution time for a schedule is time 100, the current time is 103, conditions A and B are true, and Schedule 1 has high priority. As such, Schedule 1 is eligible for execution. However, the scheduler service 202 does not execute Schedule 1 until time 105 (e.g., last execution time of 100 plus the interval duration of the active schedule). In this manner, the scheduler service 202 avoids executing schedules more frequently than intended (e.g., changing conditions like Condition A becoming True and then Condition B becoming true would cause a toggling effect).

In an example in which the computing device 204 is a mobile device, an exemplary schedule is defined to not attempt to initiate a data connection when the user is using the telephone portion of the mobile device. In another example, an exemplary schedule is defined to initiate connection activity less frequently when the radio is roaming. Alternatively or in addition, application programs 207 create schedules that are activated during the absence of an event. For example, the application program 207 creates a schedule that is activated when the computing device 204 is not roaming.

Exemplary operation of the scheduler service 202 is shown in FIG. 1. At 102, an event notification is received. For example, the event may be a time event such as the occurrence of a relative time interval (e.g., 5 minutes after boot up) or an absolute time (e.g., 12:00:00 am). The event may also be a state event, such as boot up, detecting a predetermined connection type such as a wireless fidelity (Wi-Fi) connection or a cellular connection, and/or reestablishing network connection after initially losing network connectivity, or other state of the computing device 204. The act of receiving an event may also lead to actual execution of the schedule 208 as well. If the event is a time event, it is possible that it is the normal scheduled execution time for the schedule 208. In the case of a state event, it is possible that the change of state may indicate that a particular schedule 208 is "past due" (e.g., has missed a scheduled execution) in which case the actions associated with the schedule 208 may be executed immediately upon the schedule 208 being activated.

A notification broker 224 monitors the state of events. For example, the notification broker 224 monitors state changes in a registry of the computing device 204 or other state storage mechanism. The event includes any condition such as a particular time or a device condition. In some instances, multiple events may be defined to trigger one of the schedules 208. For example, the event detected may be a first event, and the method may include grouping a second event with the first event (e.g., via a Boolean operator) and detecting the occurrence of the first and the second event.

As the various events change, some of the schedules 208 will become active while other of schedules 208 will become inactive based on the state changes. For example, a record for each of the schedules 208 in a database 210 will be updated to reflect the current event state based on their condition set. Each of the schedules 208 is set as active when the entire condition list for the schedule evaluates to TRUE.

At 104, the plurality of recurrent schedules 208 is accessed. Each of the plurality of recurrent schedules 208 has a defined activation time 410 and one or more activation conditions 412. Appendix A lists exemplary schedules 208 that are within the scope of embodiments of the invention. At 106, one or more of the accessed schedules are identified as a function of the received event notification, a current time, the defined activation time 410, and the activation conditions 412 of each of the accessed schedules. The scheduler service 202 identifies the schedules 208 for which the event is a defined condition for activation of the schedules 208, or otherwise identifies the schedules 208 to which the event applies. In an example in which the received event notification indicates that a resource is available (e.g., a network or network type), the scheduler service 202 identifies the schedules that use the resource. Further, the schedules are evaluated based on whether the schedule is enabled and all the conditions evaluate to TRUE. At 108, the identified schedules are activated. Activating the identified schedules includes executing one or more of the actions 406 associated with the identified schedules. The actions 406 include, for example, a software configuration action such as software installation, configuration, and/or update. The action may also include accessing an executable file or library on the computing device 204. The action may also include modification of a synchronization event on computing device 204 that would then result in any of the previous actions occurring.

While described in some embodiments with reference to a mobile computing device 302, aspects of the invention are applicable other devices. Further, while described in some embodiments with reference to the scheduler service 202, aspects of the invention are applicable to any component performing the functionality illustrated and described herein.

Appendix B includes a list of exemplary properties and states for the scheduler service 202.

Figure 2:
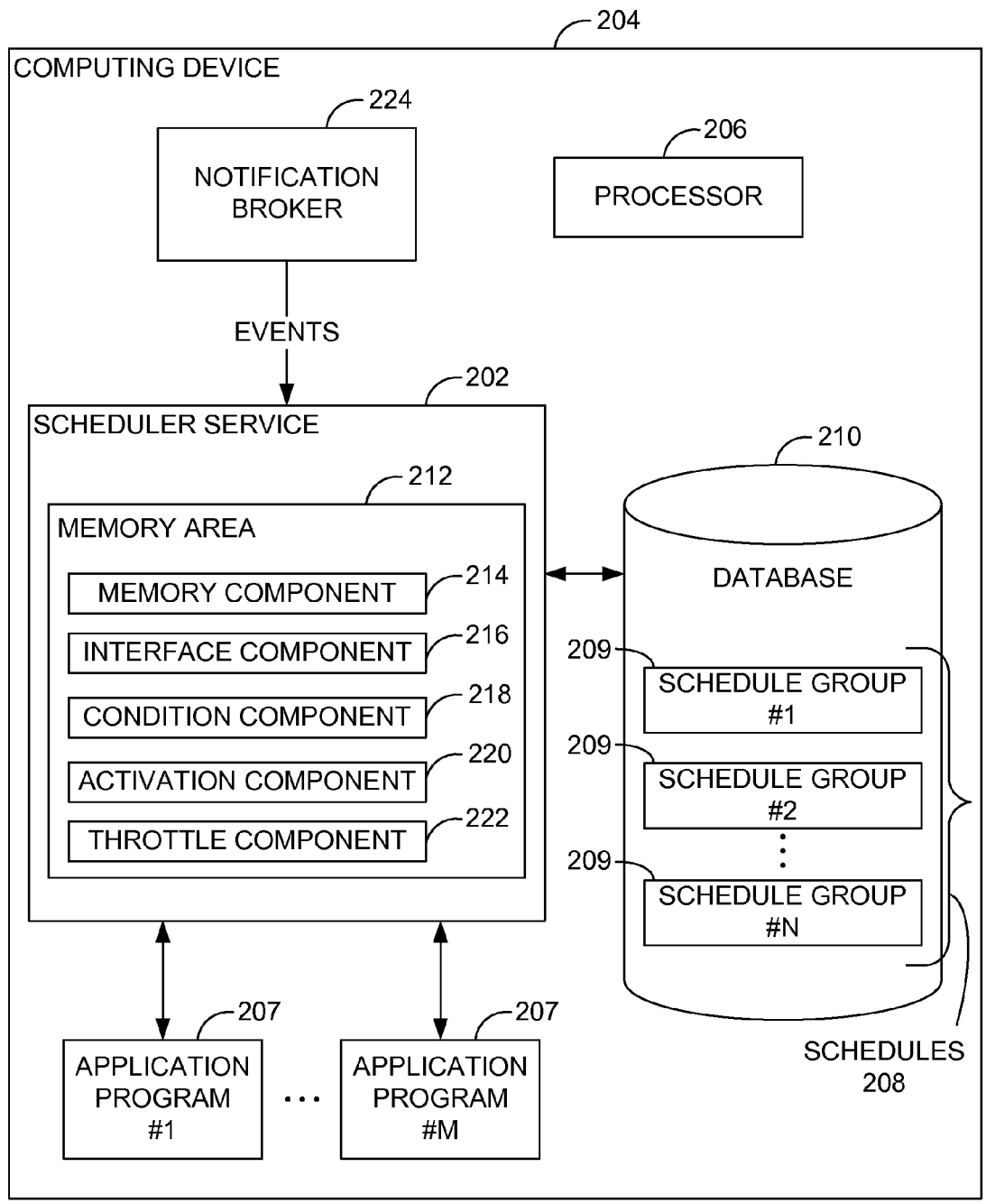
FIG. 2 is an exemplary block diagram illustrating the scheduler service executing on a computing device.

Referring to FIG. 2, an exemplary block diagram illustrates the scheduler service 202 executing on the computing device 204. The computing device 204 includes, for example, a mobile device such as a personal digital assistant (PDA) or a mobile telephone. A processor 206 is configured to execute computer-executable instructions for receiving the activation time 410, the activation conditions 412, and the interval duration 408 for each of the schedules 208 from the user, the application program 207 executing on the computing device 204, or another source. The received schedule data is stored in the database 210 or other memory area. Appendix C lists exemplary properties and definitions involved in defining the schedules 208.

The application programs 207 (or the user) may also create predefined events 404 and provide a description of the predefined events 404 to the scheduler service 202. The scheduler service triggers the actions 406 responsive to occurrence of the predefined events 404 based on the defined schedules. That is, aspects of the invention are not limited to a set of events provided by the notification broker 224 or the scheduler service 202.

The interval duration 408 determines the time period between executions or activations of the schedules 208. Successive interval durations may be the same, or be related linearly, exponentially, or the like. For example, some of the schedules 208 have progressively increasing intervals between activations. In an embodiment, the application program 207 or the user specifies one or more of an initial interval value, a type of progression (e.g., linear or exponential), and a maximum interval value. When the schedules execute, the interval starts from the initial value and then increases appropriately after each execution. If the maximum interval value is specified, the interval duration 408 never increases above the maximum interval value but remains at its highest value.

As illustrated in FIG. 2, some of the plurality of recurrent schedules 208 may be grouped into schedule groups 209 such as schedule group #1 through schedule group #N based on functionality or based on the application programs 207 that created the schedules 208. The application programs 207 include application program #1 through application program #M. The schedule groups 209 enable priority determination and control. In an embodiment, each schedule group has at most one active schedule. As such, the schedules 208 within each group are designed for mutually exclusive activation. For example, if multiple conditions are true, the priority assigned to each schedule 208 in the group 209 is assessed and only the schedule 208 with the both an active condition and the highest priority is executed. In such an embodiment, multiple schedules in the same group 209 are not executed.

The application programs 207 control which of schedules 208 become active by specifying schedule conditions and setting schedule priorities within a group. The application programs 207 assign a priority value to each of the recurrent schedules 208 in each of the groups. The assigned priority value is unique within each group. In an embodiment, the application program 207 further specifies a priority or execution order for each of the conditions associated with each of the schedules 208. Such a priority or order is useful as multiple schedule driving events may be true at the same time. The highest priority schedule in a group becomes the active schedule for the group if all the specified conditions for that schedule are met. Other conditions for schedule activation include defined absolute start and end times and a defined maximum number of executions. If at least one of the conditions of each of the schedules 208 cannot be met, then no schedule in the group is active.

The active schedule for a group may change frequently as a result of various events (e.g. change of system state impacting evaluation of schedule conditions, passage of time, change of system clock, creation/deletion of schedules 208, etc.). Whenever a schedule becomes active, the schedule starts executing. To avoid transitory effects, embodiments of the scheduler service 202 evaluate conditions based on event changes after executing a defined batch of the schedules 208. For example, event thrashing occurs when the execution of a set of the schedules 208 triggers event changes that oscillate during the course of schedule execution. Event thrashing is controlled through a "hold off" setting such that processing of event changes is inhibited for a configurable amount of time after any of the schedules 208 in the set or batch are executed. The "hold off" setting acts as a filter for discriminating transitory event states that are likely to persist for only a finite amount of time. This "hold off" setting may be configured, for example, as a setting in a configuration database, file, or registry.

Referring again to FIG. 2, the computing device 204 includes the database 210 or other memory area for storing one or more of the schedule groups 209. The processor 206 is configured to execute computer-executable instructions or components for implementing embodiments of the invention. One or more computer-readable media store computer-executable components for implementing embodiments of the scheduler service 202. For example, the components are stored on a memory area 212 and include a memory component 214, an interface component 216, a condition component 218, an activation component 220, and a throttle component 222. The memory component 214 accesses the plurality of recurrent schedules 208 based on the activation time 410 for each of the schedules 208. The interface component 216 receives notification of availability of a resource (e.g., a power-consuming resource) on the computing device 204. For example, the event notifications are received from the notification broker 224 or any other eventing, notification, or state system. While the notification broker 224 in FIG. 2 is shown as executing on the computing device 204, the notification broker 224 alternatively or in addition executes on another computing device (e.g., communicating with the computing device 204 via a network).

Based on the notification received by the interface component 216 and the activation conditions 412 associated with the recurrent schedules 208, the condition component 218 identifies one or more of the recurrent schedules accessed by the memory component 214. In an example in which the received event indicates availability of a resource, the condition component 218 identifies the schedules 208 that consume the resource during execution. The activation component 220 executes the schedules identified by the condition component 218.

The throttle component 222 limits the quantity of schedules executed by the activation component 220 as a function of a predefined throttle limit value. In an embodiment, the throttling limit is defined as a function of a consumption state of a resource on the computing device 204. For example, before the activation component 220 executes the schedules identified by the condition component 218, the activation component 220 determines via the throttle component 222 whether the throttle limit threshold has been reached. As an example, a large number of schedules or actions 406 triggered in close temporal proximity may result in acute resource starvation. To mitigate this condition, the throttle component 222 launches only a defined quantity of schedules or actions 406 during any given time window. Each time a schedule or action is successfully launched, a counter increments. If the counter value reaches the throttle limit, further launches of schedules or actions 406 are delayed until the counter resets to zero or otherwise decreases. For example, the counter resets to zero by a thread executing at regular, predefined intervals. Alternatively or in addition, the counter decrements when a schedule or action using the resource releases the resource.

Figure 3:
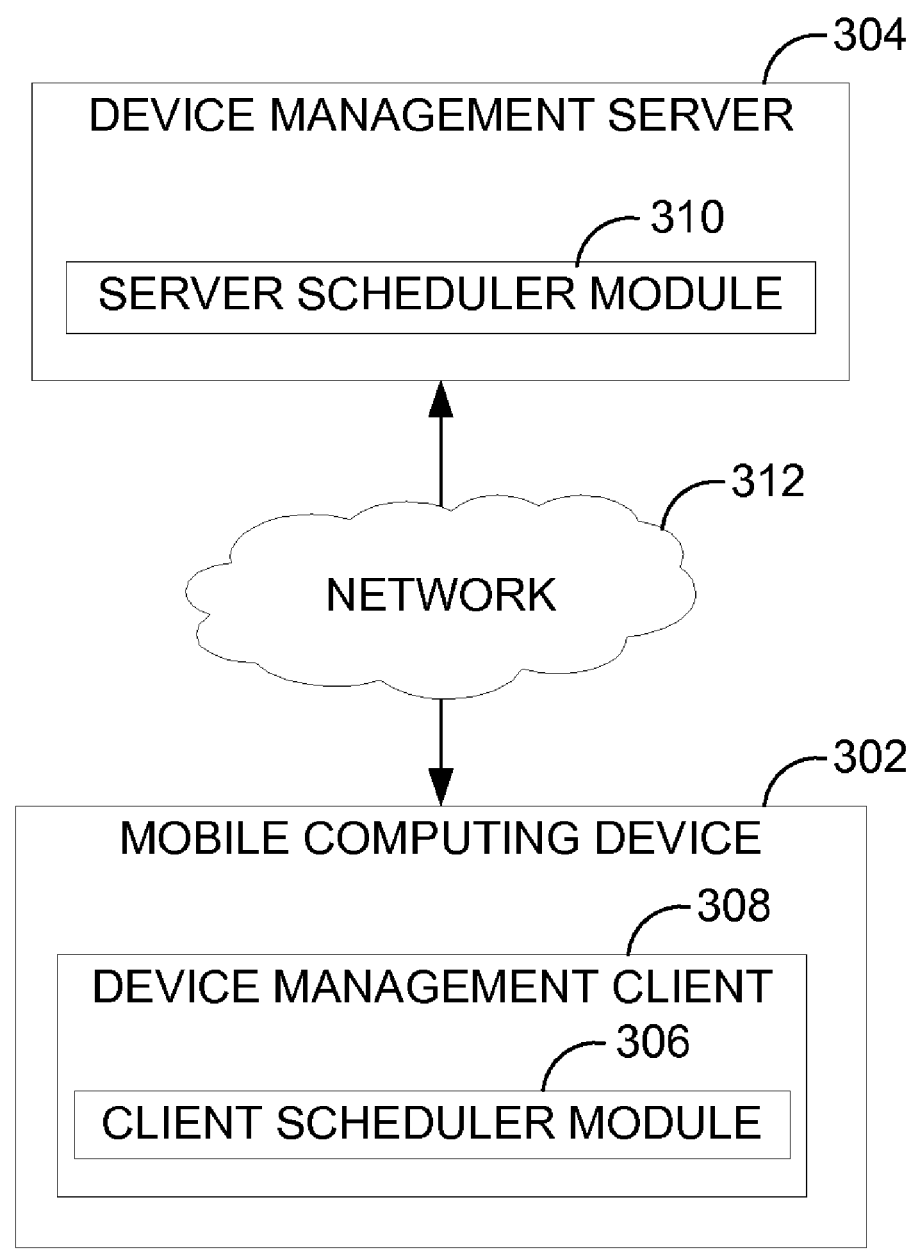
FIG. 3 is an exemplary block diagram illustrating control of a mobile computing device by a device management server.

Referring to FIG. 3, an exemplary block diagram illustrates control of the mobile computing device 302 by a device management server 304. In FIG. 3, the scheduler service 202 from FIG. 2 acts as a client scheduler module 306 executing within a device management client 308 communicating with a server scheduler module 310 executing on the device management server 304 or other computing device (e.g., connected via a network 312).

Figure 4:
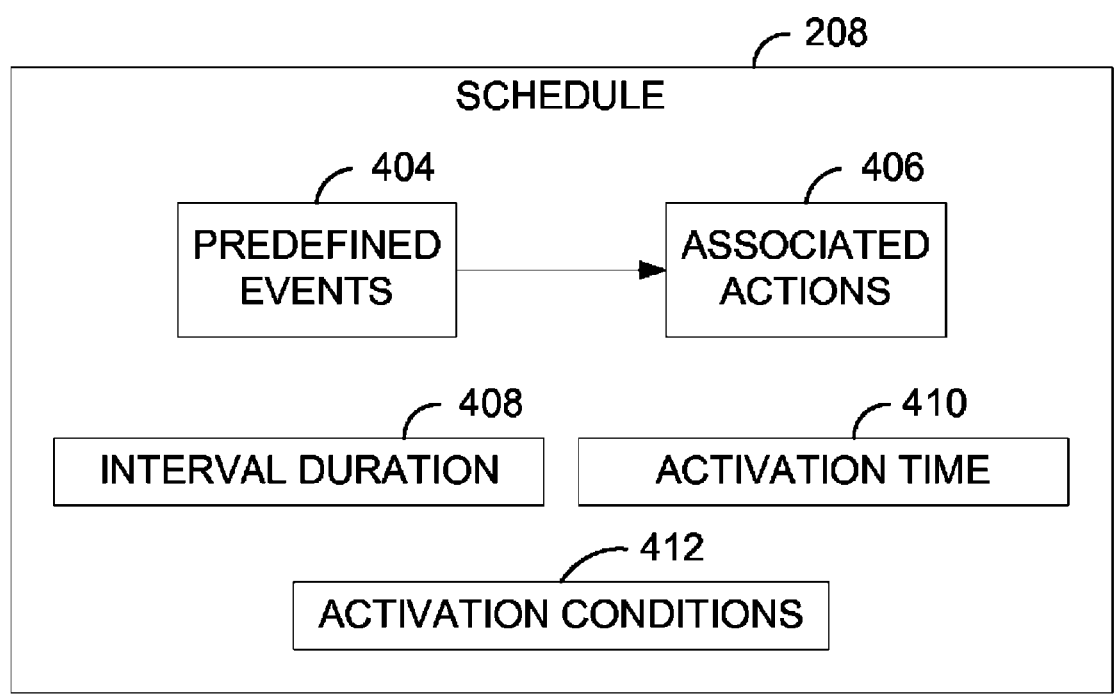
FIG. 4 is an exemplary block diagram illustrating a data structure representing a schedule.

Referring to FIG. 4, an exemplary block diagram illustrates a data structure representing the schedules 208. The schedules 208 are stored in a data structure that may be encoded in an extensible markup language (XML) format. Each of the schedules 208 include a list of the predefined events 404 and the associated actions 406, along with the interval duration 408, the activation time 410, and the activation conditions 412. The predefined events 404 include time events and state events. The associated actions 406 include operations to be performed when the predefined events 404 occur. The actions 406 specify, for example, an executable file path and command line parameters.

Figure 5:
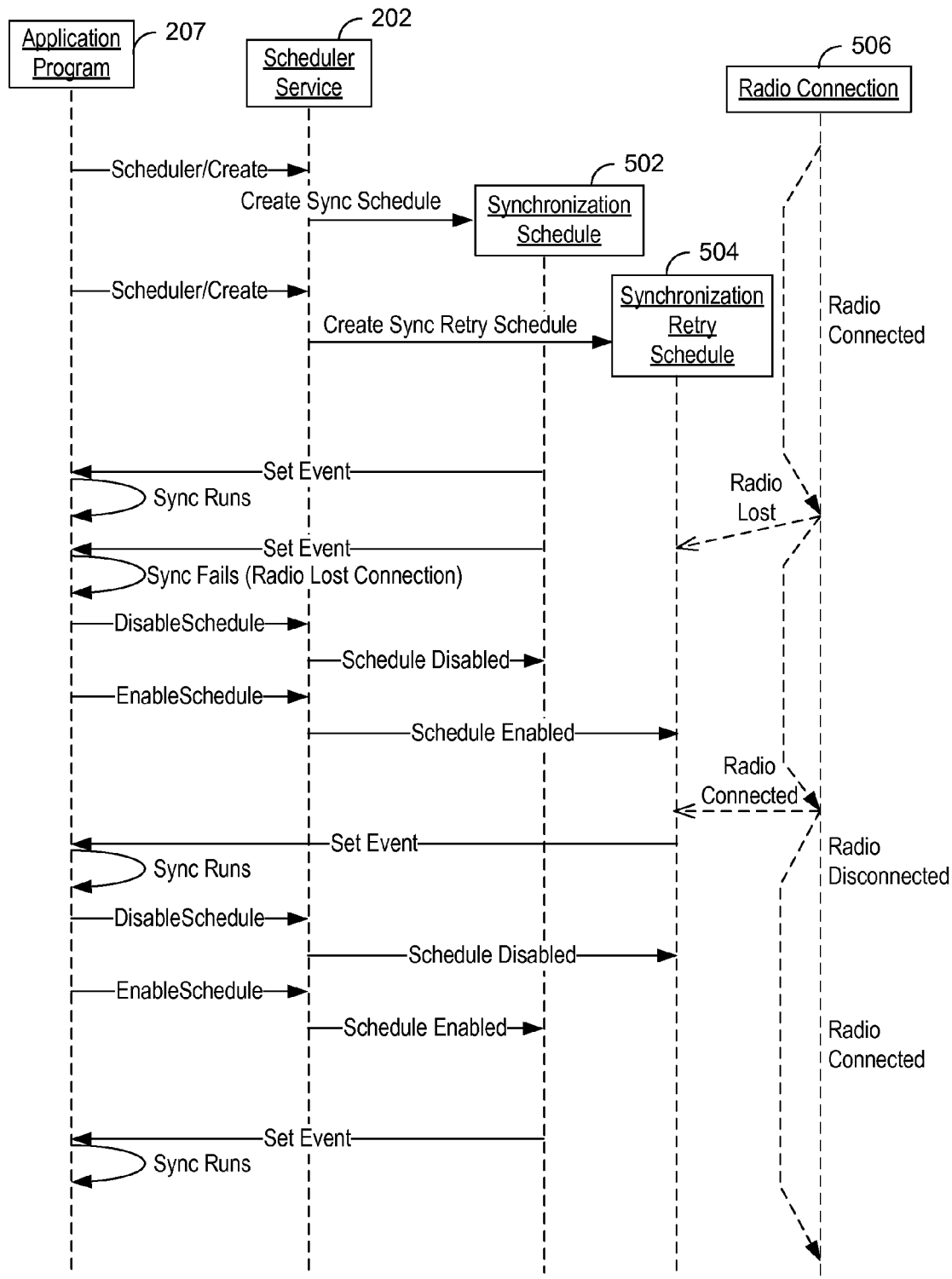
FIG. 5 is an exemplary block diagram illustrating a retry sequence for execution of a schedule based on availability of a resource.

Referring to FIG. 5, an exemplary block diagram illustrates a retry sequence for activating and de-activating mutually exclusive schedules based on availability of a resource (e.g., a radio connection 506 on a mobile device). The application program 207 communicates with the scheduler service 202 to create a synchronization schedule 502 and a synchronization retry schedule 504. The interval duration 408 for the synchronization schedule 502 differs from the interval duration 408 for the synchronization retry schedule 504. In the example of FIG. 5, the synchronization schedule 502 and the synchronization retry schedule 504 execute to synchronize data between the mobile computing device 302 and a server at a particular time if the radio is connected. When the particular time occurs and the radio is connected, the activation conditions 412 of the synchronization schedule 502 are met and synchronization actions are executed for the application program 207. If the radio connection 506 terminates, the scheduler service 202 disables the synchronization schedule 502 and enables the synchronization retry schedule 504. At that point, execution of the synchronization schedule 502 is suspended. When the radio connection 506 is reestablished, an event is generated. The retry schedule then executes performing whatever action is needed to correct or compensate for the radio disconnection. The application or scheduler service 202 disables the synchronization retry schedule 504 and enables the synchronization schedule 502.

Alternatively, the application or scheduler service 202 suspends execution of the synchronization schedule 502 when the radio becomes unavailable. The scheduler service 202 attempts to re-activate the synchronization schedule 502 (e.g., reconnect with the radio) at linearly increasing or exponentially increasing intervals until the radio becomes available. The linear and exponential intervals are designed to reduce consumption of a resource (e.g., the network connection) while trying to resume execution of the synchronization schedule 502.

Examples

The following examples further illustrate embodiments of the invention. If the application program 207 has a set of conditional schedules yet has a schedule that is created for execution regardless of one or more of the conditions, the application program 207 defines two groups of schedules. One group encompasses the conditional schedules while the other group encompasses the schedule that should execute regardless of the excepted conditions. For example, the first group includes a schedule for data synchronization every fifteen minutes during peak hours, every five minutes if the computing device 204 is cradled, and every two hours during off-peak hours. In some embodiments, cradled is defined as connecting the computing device 204 to the desktop via a connection such as a universal serial bus (USB) so the computing device 204 is using the desktop's network connectivity and being charged at the same time. The second group includes a schedule that executes the action at noon every day.

In another example, the notification broker 224 provides the scheduler service 202 with an event notification that the battery level or available memory storage for the computing device 204 is critically low. The application programs 207 are able to select whether execution of their schedules should be suspended under such conditions and resumed when the battery level has improved (e.g., via another event notification).

In another example, schedules execute more frequently when a desirable network connection or power source is available. Such a network connection includes a desktop pass-through connection when the computing device 204 is connected to another computing device with a high-bandwidth network connection. Further, these schedules may execute more frequently regardless of other events such as peak or off-peak hours.

In an auction example, the application program 207 defines one of the schedules to obtain the latest bid price on an item infrequently (e.g., daily) during the first few days of the auction. Another schedule is defined to obtain the latest bid price more frequently (e.g., hourly) on the last day of the auction, and then in near real-time during the few minutes of the auction. In this example, the interval duration 408 is a function of the auction closing time. In this example the schedules are also set up to automatically delete themselves as they expire, further reducing the load on the application.

Exemplary Operating Environment

A computing device or computer such as described herein has one or more processors or processing units and a system memory. The computer typically has at least some form of computer readable media comprising computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations.

Embodiments of the invention may be described in the general context of computer-executable instructions, such as program modules, executed by one or more computers or other devices. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for batching a plurality of the recurrent schedules 208 and exemplary means for managing each of the recurrent schedules 208 based on the defined interval duration 408 and activation conditions 412 for each of the recurrent schedules 208.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Listed below are sample schedules within the scope of embodiments of the invention.

In another example, an application has a schedule that executes every five minutes when the device has wireless fidelity (Wi-Fi) network access or desktop-passthrough connectivity or BLUETOOTH brand network access.

In another example, an application has a schedule that executes every three minutes when it is connected to a free network and a power source.

In another example, a schedule is activated when the device is connected to a free network and power is available (e.g., connected as a desktop pass-through). This schedule allows for frequent access to the network. In contrast, if the device is on network roaming, another schedule is activated. This schedule has less frequent network access to avoid excessive data costs.

In another example, a stock quote update application has a more frequently activated schedule for obtaining stock quotes during the peak trading hours. Similarly, the stock quote update application has another schedule for accessing the network less during off-peak trading hours.

In another example, a device is scheduled to contact a server at 12:00. If the server is down at that time, the device has a schedule that selects a linear backoff retry algorithm.

Appendix B

Listed below are exemplary properties and states for a scheduler according to embodiments of the invention.

TABLE B1

| Global State. | |
|---|---|
| Name | Description |
| CURRENT_TIME | represents the value of the system clock in UTC |
| SERVICE_START_TIME | represents the value of the system clock in UTC, when the Service Started |
| SERVICE_START_TICK | represents the value of the Tick count when the service started |
| SCHEDULES | Collection of all schedules in the system. |
| AGGREGATION_ENABLED | Enable or disable the aggregation function |

TABLE B2

State per Schedule.

| Name | Description |
|---|---|
| CURRENT_INTERVAL | Defines the interval which is used to compute NEXT_RUN_TIME. This gets reset to initial value upon service start or when the schedule becomes active. |
| CURRENT_RUN_COUNT | Count which keeps track of number of times the schedule has fired. |
| NEXT_RUN_TIME | Time at which the next scheduled firing is supposed to happen. −1 if the schedule was never scheduled to fire. |
| ENABLED | If enabled, the schedule could be eligible to be active. |

TABLE B3

State per Group.

| Name | Description |
|---|---|
| GROUP_LAST_ACTUAL_RUN_TIME | Time at which last firing of a schedule among its schedules occurred. −1 If no schedule fired in this group then. |
| GROUP_LAST_SCHEDULED_RUN_TIME | Most recent time at which a schedule among its schedules was scheduled to fire. −1, if no schedule was scheduled earlier. |
| ACTIVE_SCHEDULE | Is the active schedule in the group |

TABLE B4

Global Properties.

| Name | Description |
|---|---|
| FUZZ_THROTTLING_LIMIT | For every adjustable event, this is the maximum number of schedules which can be aggregated together. This is used for Throttling. |
| STARTUP_THROTTLING_LIMIT | Upon service startup, if there are multiple schedules which need execution, then this setting is used to throttle their execution, by batching those schedules with this limit. Each Batch's execution is delayed by the STARTUP_THROTTLING_DELAY factor. |
| STARTUP_THROTTLING_DELAY | If there are more than STARTUP_THROTTLING_LIMIT schedules which need to get run at startup, the schedules are batched and each batch is delayed by this delay. |

TABLE B5

Schedule Properties.

| Name | Default Value | Description |
|---|---|---|
| ID | N/A | Uniquely identifies the schedule in the system |
| GROUP_ID | N/A | Identifies the group, the schedule is part of. |
| START_TIME | 0 (no start time) | Absolute time when the scheduler timeline starts. Schedule guarantees that the associated actions will not be triggered before start time. Start time is optional. |
| RELATIVE_START_TIME | 0 (no relative start time) | The time delay from the schedule creation time at which the schedule could become active. |
| END_TIME | −1 (no end time) | Absolute time when the scheduler timeline ends. Schedule guarantees that the associated actions will not be triggered after end time. End time is optional |
| MAX_RUN_COUNT | −1 (infinite) | Maximum number of times a schedule can fire. |
| DELETE_WHEN_EXPIRED | FALSE | Specifies if the schedule must be deleted after it expires |
| USES_NETWORKING | FALSE | Specifies if the actions associated with the schedule use networking. This is used for aligning the schedules to conserve battery power. |
| RID | Null | Identifies the radio id, if the actions use networking. |
| EARLY_RUN_TIME | 0 [Aggregation disabled] | Defines the amount of time the schedule run can be advanced from its schedule run. |
| CONDITIONS | NULL | Set of conditions which must be true, for the schedule to be active. |
| ACTIONS | N/A | Set of actions which are triggered for schedule when schedule executes |

Appendix C

Listed below in Table C1 are exemplary properties and definitions involved in defining a recurrent schedule.

TABLE C1

Exemplary Properties for Recurrent Schedule.

| Properties | Definition |
|---|---|
| AbsoluteStartTime | The time in UTC the schedule begins. If absent at schedule creation, the system assigns the "T=0" starttime, a system time that is in the past, designed to align all schedules to the same start time. The schedule executes at the aligned interval, not to exceed the interval duration. If the application specified an absolute start time that occurs in the past, and the application specifies that IntervalDurationDrift = True, then the behavior is the same as if AbsoluteStartTime was absent (align to the system assigned T=0). Else the schedules align to the AbsoluteStartTime provided. If the absolute start time is greater than the current time, than the first scheduled time will be the absolute start time. If an absolute start time is provided, it will not be reset after the device loses power. For example, if the application specifies 5pm UTC as the start time, with a 24 hour duration, the schedule will always attempt to execute at 5pm UTC daily. All schedules persist across reboot because the schedules are saved into a persistent store. |

TABLE C1-continued

Exemplary Properties for Recurrent Schedule.

| Properties | Definition |
|---|---|
| RelativeStartTime | The number of minutes relative to the time of provisioning when the schedule should begin. RelativeStartTime has more meaning for remotely managed operations, where the server doesn't know what time it is on the device (the user may have change the time due to time zone) and the server would like to configure the schedule to start x minutes after the remote command is received by the device. Upon provisioning, the scheduler code dynamically creates or overwrites the AbsoluteStart time if it exists, setting it to the current time plus this value. If both AbsoluteTime and RelativeTime are provided, then the last value received via the remote command is the one the scheduler respects. The RelativeStartTime is stored as minutes and if queried, the result will be the number of minutes. |
| ScheduleRunCount | This is the number of times the actions are scheduled to execute, not to exceed the end date and time, if the end date is specified. If this field is not present and the end date present, the schedule runs until the end date. If this field is zero, the schedule runs infinitely. |
| ActualRunCount | This is the number of times the scheduler has executed the schedule. |
| AbsoluteEnd | The time in UTC the schedule ends. If absent, the schedule never ends unless there is a RelativeEnd. If both AbsoluteEnd and RelativeEnd are provided, then the last value received from the remote management server is the one the Scheduler respects. |
| RelativeEnd | The number of minutes relative to the time of provisioning the schedule should end. Upon provisioning, the scheduler code dynamically creates or overwrites the AbsoluteEnd time if it exists, setting it to the current time plus this value. If both AbsoluteEnd and RelativeEnd are provided, then the last value received is the one the Scheduler respects. The RelativeEnd is stored as minutes and if queried, the result will be the number of minutes. |
| IntervalDuration | This is the base number of minutes between schedule events. If zero, then the schedule will return an error since the schedule is infinite. |
| LinearBackoff | LinearBackoff is a type of schedule that applications may want to use when it is in retry mode. LinearBackoff takes the IntervalDuration and calculates the time between schedules as: X, 2X, 3X, 4X and ending when the AbsoluteEnd is reached or ScheduleRunCount is reached, whichever occurs first. |
| ExponentialBackoff | ExponentialBackoff is a type of schedule that applications may want to use when it is in retry mode. ExponentialBackoff takes the IntervalDuration and calculates the time between schedule events as: X, 2X, 4X, 8X, 16X, 32X and ending when the AbsoluteEnd is reached or ScheduleRunCount is reached, whichever occurs first. |
| Action | The application can specify an action to execute at the scheduled time. Exemplary actions supported are: launch an EXE or create a named event. A schedule can exist without an action - it would be a schedule to do nothing, which is relevant, for example: when the radio roams, do nothing. |
| RequiresNetwork | This property indicates whether the application needs a network connection for their scheduled actions. |
| DeleteWhenExpired | The application can specify that the schedule is deleted when expired. When set to true, the Schedule is deleted when the ActualRunCount is equal to the ScheduleRunCount. When the schedule end date occurs, there is a possibility that the user or the system has changed the device clock. |
| Condition | A recurrence schedule can be activated based on an occurrence of an event or events. For example: activate this schedule when the device is cradled and desktop pass-through is available. When null, ConditionPriority is not required. Note: the events in the state and notification broker are limitless, applications can create and maintain any types of events that other applications are interested in. |
| ConditionPriority | This tells the Scheduler the order to check conditions that activate a schedule. Multiple conditions can be true at the same time, so this order is necessary. A ConditionPriority is required when a condition has been set. Assigning the same priority to multiple schedules in the same group will result in an error. |
| GroupID | An ID that represents a grouping of the schedules that have conditions that will be checked in the order specified by ConditionPriority. Within the GroupID, each priority assignment must be unique. |
| SpecifyRunEarlyTime | If False, application does not want to specify the RunEarlyTime. Use the number of minutes equal to 10% of the interval duration as the "run early tolerance" in this case. If True, the application wants to specify the RunEarlyTime. |
| RunEarlyTime | If SpecifyRunEarlyTime is True, this value is the percentage of the IntervalDuration that the application is willing to be executed earlier than scheduled, in order to help the device preserve battery by piggybacking on an available connection. |
| IntervalDurationDrift | If False, the IntervalDuration is an average value. This means if the scheduled time executes early due to aggregation, the next scheduled time is not adjusted to ensure that the IntervalDuration is X. For example, a service has a schedule to run every 1 hr, the scheduled time is noon and 1pm. At 11:55pm, there is an existing data connection and the service has a RunEarlyTime that allows it to be scheduled early, to piggy-back on the 11:55pm connection event. The next scheduled time remains at 1pm. If True, the IntervalDuration is the maximum amount of time between scheduled events. This means that the next scheduled time is equal to the last scheduled time + the IntervalDuration. |

What is claimed is:

1. One or more computer storage media having computer-executable components for managing recurrent schedules on a mobile device, said components comprising:
    a memory component that when executed causes a processor of the mobile device to access a plurality of recurrent schedules based on a defined activation time associated therewith, each of said plurality of recurrent schedules further having one or more activation conditions corresponding to a state of the mobile device;
    an interface component that when executed causes a processor of the mobile device to receive notification of availability of a resource on the mobile device;
    a condition component that when executed causes a processor of the mobile device to identify, based on the notification received by the interface component and the activation conditions associated with the plurality of recurrent schedules, at least two of the plurality of recurrent schedules accessed by the memory component; and
    an activation component that when executed causes a processor of the mobile device to execute the at least two of the plurality of recurrent schedules identified by the condition component to use the resource.

2. The computer storage media of claim 1, further comprising a throttle component for limiting a quantity of schedules executed by the activation component as a function of a predefined limit value.

3. The computer storage media of claim 1, wherein the resource comprises a connection to a network, and wherein at least one of the plurality of recurrent schedules has associated therewith a plurality of the activation conditions combined via a Boolean operator.

4. A method comprising:
receiving, by a computing device, an event notification;
accessing a plurality of recurrent schedules, each of said plurality of recurrent schedules having a defined activation time and one or more activation conditions associated therewith, the one or more activation conditions corresponding to a state of the computing device;
identifying at least two of the accessed plurality of recurrent schedules as a function of the received event notification, a current time, the defined activation time, and the activation conditions of each of the accessed plurality of recurrent schedules; and
activating, by the computing device, the identified at least two of the accessed plurality of recurrent schedules.

5. The method of claim 4, wherein activating the identified at least two of the accessed plurality of recurrent schedules comprising executing one or more actions associated with the identified at least two of the accessed plurality of recurrent schedules.

6. The method of claim 5, further comprising grouping the plurality of recurrent schedules based on the actions.

7. The method of claim 6, further comprising assigning a priority value to each of the recurrent schedules in each of the groups, wherein the assigned priority value is unique within each of the groups.

8. The method of claim 7, wherein identifying the at least two of the accessed plurality of recurrent schedules comprises identifying the at least two of the accessed plurality of recurrent schedules as a function of the assigned priority value.

9. The method of claim 4, wherein accessing the plurality of recurrent schedules comprises accessing the plurality of recurrent schedules associated with a plurality of application programs.

10. The method of claim 9, wherein accessing the plurality of recurrent schedules comprises accessing a plurality of groups of recurrent schedules, wherein each of the groups corresponds to one of the application programs.

11. The method of claim 4, wherein receiving the event notification comprises receiving notification that a resource is available, and wherein identifying the at least two of the accessed plurality of recurrent schedules comprises identifying at least two of the accessed plurality of recurrent schedules that use the available resource.

12. The method of claim 11, further comprising:
suspending the activated at least two of the accessed plurality of recurrent schedules when the resource becomes unavailable; and
attempting to re-activate the suspended at least two of the accessed plurality of recurrent schedules at linearly increasing intervals until the resource becomes available.

13. The method of claim 11, further comprising:
suspending the activated at least two of the accessed plurality of recurrent schedules when the resource becomes unavailable; and
attempting to re-activate the suspended at least two of the accessed plurality of recurrent schedules at exponentially increasing intervals until the resource becomes available.

14. The method of claim 4, further comprising defining a throttling limit, and wherein activating the identified at least two of the accessed plurality of recurrent schedules comprises activating a quantity of the identified at least two of the accessed plurality of recurrent schedules that is less than the defined throttling limit.

15. The method of claim 14, wherein the identified at least two of the accessed plurality of recurrent schedules activate on a mobile device, and wherein defining the throttling limit comprises defining the throttling limit as a function of a consumption state of a resource on the mobile device.

16. A system comprising:
a memory area for storing a plurality of groups of recurrent schedules, wherein the recurrent schedules in each of the groups are defined for mutually exclusive execution, each of the recurrent schedules having a defined activation time and one or more activation conditions associated therewith, the one or more activation conditions corresponding to a state of a computing device; and
a processor configured to execute computer-executable instructions for:
receiving notification of an event;
identifying, based on the received notification and the activation conditions associated with the recurrent schedules, one of the recurrent schedules within at least one of the groups of recurrent schedules stored in the memory area; and
executing, on the computing device only the identified one of the recurrent schedules within the at least one of the groups.

17. The system of claim 16, wherein each of the recurrent schedules has a defined interval duration between activation times.

18. The system of claim 17, further comprising means for managing each of the recurrent schedules based on the defined interval duration and activation conditions for each of the recurrent schedules.

19. The system of claim 16, wherein the processor is associated with a scheduler service, and wherein the processor is further configured to execute computer-executable instructions for receiving a description of a predefined event from a user or an application program for use by the scheduler service.

20. The system of claim 16, further comprising means for batching a plurality of the recurrent schedules, wherein the processor is further configured to execute computer-executable instructions for executing each of the batched plurality of schedules before receiving another notification.

* * * * *

UNITED STATES PATENT AND TRADEMARK OFFICE
CERTIFICATE OF CORRECTION

| | | |
|---|---|---|
| PATENT NO. | : 8,166,145 B2 | Page 1 of 1 |
| APPLICATION NO. | : 12/051849 | |
| DATED | : April 24, 2012 | |
| INVENTOR(S) | : Anh P. Tran et al. | |

It is certified that error appears in the above-identified patent and that said Letters Patent is hereby corrected as shown below:

In column 14, line 36, in claim 16, after "device" insert -- , --.

Signed and Sealed this
Ninth Day of October, 2012

David J. Kappos
*Director of the United States Patent and Trademark Office*